(12) United States Patent
Cannon

(10) Patent No.: US 11,197,554 B2
(45) Date of Patent: Dec. 14, 2021

(54) SEAT MOVEABLE BETWEEN A SEAT CONFIGURATION AND A BED CONFIGURATION

(71) Applicant: Nicola Cannon, Morecambe (GB)

(72) Inventor: Nicola Cannon, Morecambe (GB)

(*) Notice: Subject to any disclaimer, the term of this patent is extended or adjusted under 35 U.S.C. 154(b) by 0 days.

(21) Appl. No.: 16/759,133

(22) PCT Filed: Oct. 26, 2018

(86) PCT No.: PCT/GB2018/053107
§ 371 (c)(1),
(2) Date: Apr. 24, 2020

(87) PCT Pub. No.: WO2019/081946
PCT Pub. Date: May 2, 2019

(65) Prior Publication Data
US 2020/0337467 A1    Oct. 29, 2020

(30) Foreign Application Priority Data

Oct. 26, 2017  (GB) ...................................... 1717648

(51) Int. Cl.
*A47C 17/16*    (2006.01)
*A47C 17/165*   (2006.01)
(Continued)

(52) U.S. Cl.
CPC .......... *A47C 17/165* (2013.01); *A47C 17/045* (2013.01); *B60B 33/06* (2013.01);
(Continued)

(58) Field of Classification Search
CPC ..... A47C 17/165; A47C 17/045; B63B 29/04; B63B 2029/043; B64D 11/0641;
(Continued)

(56) References Cited

U.S. PATENT DOCUMENTS

| 1,057,702 A | 4/1913 | Bennett |
| 1,815,877 A | 7/1931 | Thum |

(Continued)

FOREIGN PATENT DOCUMENTS

| CN | 206107004 U | 4/2017 |
| DE | 1137841 B | 10/1962 |

(Continued)

*Primary Examiner* — Mark R Wendell
(74) *Attorney, Agent, or Firm* — Invention To Patent Services; Alex Hobson

(57) ABSTRACT

A seat 100 moveable between a seat configuration and a bed configuration, the seat 100 comprising
a squab 120 including upper and lower cushions 126, 124,
a conversion mechanism configured to move the squab 120, for converting the seat 100 between the seat and bed configurations, and
a backrest 122 connected to the squab 120 or conversion mechanism, for moving with the squab 120,
the squab 120 being laterally displaceable by the conversion mechanism between a first position in the seat configuration and a second position in the bed configuration, and the backrest 122 being configured to occupy a space at an end of the squab 120 which is made available by lateral displacement of the squab 120 into the second position, and the upper cushion 126 of the (Continued)

squab 120 being movable relative to the lower cushion 124 for covering the backrest 122 in the bed configuration.

19 Claims, 6 Drawing Sheets

(51) Int. Cl.
| | |
|---|---|
| *B64D 11/06* | (2006.01) |
| *A47C 17/04* | (2006.01) |
| *B60B 33/06* | (2006.01) |
| *B60N 2/34* | (2006.01) |
| *B60N 3/00* | (2006.01) |
| *B61D 31/00* | (2006.01) |
| *B61D 33/00* | (2006.01) |
| *B63B 29/04* | (2006.01) |
| *B60N 2/24* | (2006.01) |

(52) U.S. Cl.
CPC ............... *B60N 2/34* (2013.01); *B60N 3/008* (2013.01); *B61D 31/00* (2013.01); *B61D 33/00* (2013.01); *B63B 29/04* (2013.01); *B64D 11/0641* (2014.12); *B60N 2/242* (2013.01); *B63B 2029/043* (2013.01)

(58) Field of Classification Search
CPC .......... B60N 2/34; B60N 2/242; B60N 3/008; B60B 33/06; B61D 31/00; B61D 33/00
USPC .......................................................... 297/67
See application file for complete search history.

(56) References Cited

U.S. PATENT DOCUMENTS

| | | | | |
|---|---|---|---|---|
| 2,348,407 | A | | 10/1940 | O'Neill |
| 4,204,288 | A | | 5/1980 | Villa et al. |
| 4,756,034 | A | | 7/1988 | Stewart |
| 5,197,776 | A | * | 3/1993 | Brown ...................... B60P 3/38 |
| | | | | 296/65.03 |
| 5,682,629 | A | * | 11/1997 | Bortoluzzi ......... A47C 17/1753 |
| | | | | 5/18.1 |
| 5,718,479 | A | * | 2/1998 | Rautenbach ........... A47C 17/80 |
| | | | | 297/353 |
| 2006/0219843 | A1 | * | 10/2006 | Martin ............... B64D 11/0644 |
| | | | | 244/118.6 |
| 2009/0146005 | A1 | * | 6/2009 | Bettell ................. B64D 11/064 |
| | | | | 244/118.6 |
| 2010/0193634 | A1 | * | 8/2010 | Hankinson ......... B64D 11/0605 |
| | | | | 244/118.6 |
| 2010/0201172 | A1 | * | 8/2010 | Hudswell ............... B64D 11/06 |
| | | | | 297/340 |
| 2020/0277059 | A1 | * | 9/2020 | Ng ....................... B64D 11/064 |

FOREIGN PATENT DOCUMENTS

| | | |
|---|---|---|
| DE | 3500689 A1 | 7/1986 |
| DE | 20211373 U1 | 11/2002 |
| DE | 202008008715 U1 | 11/2009 |
| DE | 102009012811 A1 | 12/2009 |
| GB | 494152 A | 10/1938 |
| NL | 1021757 C | 2/2004 |

* cited by examiner

SEAT MOVEABLE BETWEEN A SEAT CONFIGURATION AND A BED CONFIGURATION

The present invention relates to a seat which is moveable between a seat configuration and a bed configuration.

BACKGROUND TO THE INVENTION

In a living space where space is restricted—for example, in a caravan, a camper van, boat or trailer tent—it is well known to provide seats which can convert into a bed. In its simplest form, this is achieved by turning over a seat cushion.

In the front of most caravans, a pair of seats face one another and extend parallel along the sides of the caravan. A space is provided between the seats, which enables both seats to be used and the occupants can face one another. The seat cushions typically rest on bases, which usually have some storage space within, and backrest cushions extend up the side walls of the caravan. This arrangement is usually adapted to convert into a double bed.

Typically, a number of slats, provided on fabric tapes are located in a cupboard and can be extended through the space. The slats are supported at their ends on the bases and when fully extended, provide support for cushions between the bases.

To complete the bed, the base cushions are turned over and the backrest cushions are placed face down on the slats to completely fill the space. The cushions are turned because they are upholstered on one side with button upholstery on one side for seating, but are upholstered flat on the other side for sleeping. The seat cushions are also usually bolstered on a front edge, to give extra support when seated. This means that the cushions, when turned, are not flat across the bases and slats.

It will be appreciated that to convert from the seating arrangement to the sleeping arrangement is a highly physical process, because large cushions have to be turned and placed. Furthermore, a topper is often placed onto the bed to even out the surface. After this, bedding has to be placed over the topper. All in all, the conversion is very time-consuming, physical and awkward. The bed, once assembled, can only be accessed from one end, and so putting a sheet on the topper and laying out a duvet and pillows involves climbing over the bed.

It is an object of the present invention to reduce or substantially obviate the aforementioned problems.

STATEMENT OF INVENTION

According to a first aspect of the present invention, there is provided a seat moveable between a seat configuration and a bed configuration, the seat comprising
a squab including upper and lower cushions,
a conversion mechanism configured to move the squab, for converting the seat between the seat and bed configurations, and
a backrest connected to the squab or linked to the conversion mechanism, for moving with the squab,
the squab being laterally displaceable by the conversion mechanism between a first position in the seat configuration and a second position in the bed configuration, the backrest being configured to in use occupy a space at an end of the squab substantially in concert with lateral displacement of the squab into the second position, the space being made available by lateral displacement of the squab, and the upper cushion of the squab being movable relative to the lower cushion for covering the backrest in the bed configuration.

Optional features are presented in the dependent claims.

This enables a seat to be quickly and easily converted between uses, for sitting on the squab or sleeping on a mattress formed by the squab and backrest. The backrest cushion is moved together with the squab into and out of the bed configuration, and does not need to be moved or handled separately. The mechanism automates the conversion between each configuration, reducing the effort required to convert the seat to a bed (and back to a seat). Concealing a bed area within the squab means that only part of the squab needs to be flipped over, rather than the whole cushion, which further reduces the efforted involved. This also saves a significant amount of time when converting the seat/bed to the other configuration. The backrest effectively moves into the space vacated by the squab as it is vacated during the conversion to a bed configuration due to its link to the squab or part of the conversion mechanism.

The backrest may be connected to the lower cushion. The backrest may be connected to the upper cushion. The upper and lower cushions may be connected. The backrest may be connected to a rear part or rear side of the squab, for example. In the seat configuration, the backrest may be disposed above a rear part or rear side of the squab, such as above the lower cushion but not the upper cushion, for example. The backrest may be disposed rearwards of the upper cushion in the seat configuration (taken relative to the front of the seat). The upper cushion may be sized to substantially match the width and/or height of the backrest. The upper cushion may have a thickness which substantially matches a difference in thickness between the backrest and the lower cushion.

Bedding may be connected or fitted to the squab. The bedding may include a sheet and/or a duvet for covering the bed area.

This provides bedding which is stored in and integral with the seat. When the seat is converted into the bed configuration, the bedding is pre-made and ready for use. The bedsheet is quite thin, and so does not significantly distort the shape of the squab in the seat configuration, when stored away. However, a duvet is thicker. A pocket may be formed in the squab between the top and base portions for containing a duvet. In the seat configuration, the bedding may be sandwiched between the squab portions. Depending on the size of the bed, custom-sized bedding may be provided.

The upper cushion of the squab may be adapted to cover the backrest during or after lateral displacement of the squab into the second position. The upper cushion of the squab may be further adapted to move onto the lower cushion before or during lateral displacement of the squab into the first position. Preferably, the upper cushion of the squab is tethered to a lower region. Lateral displacement of the squab may cause inversion of the upper cushion.

When converting the seat into the bed configuration, the upper cushion needs to be displaced away from the lower cushion to reveal the sleeping surface for use in the bed configuration. By tethering the upper cushion to a particular region, lateral displacement of the squab can effect movement of the upper cushion. This enables displacement of the different elements to occur substantially in concert. For example, the upper cushion may be tethered to a point or area underneath the base cushion of the squab. The tether(s) may extend through or around the base cushion.

The upper cushion of the squab may be disposed on top of the backrest in the bed configuration for providing a flat surface for sleeping on. The total thickness of the backrest and the upper cushion of the squab overlying the backrest may be substantially the same as the thickness of the base cushion of the squab.

The backrest is typically less thick than the squab, because the squab is designed to receive a bigger load in use. The thickness of the upper cushion is selected to complement the thickness of the backrest. By doing so, the thickness of the mattress formed by the backrest and the upper cushion, and the adjacent base cushion of the squab, is substantially uniform in all regions. This provides a surface which is more comfortable to sleep on.

A boundary between the backrest and the lower cushion may be offset from another boundary between the lower and upper cushions of the squab, when the seat is in the bed configuration. In other words, the vertical 'join' where the backrest meets or abuts the lower cushion is in a different position to the vertical 'join' where the upper cushion meets or abuts the lower cushion. Preferably, the upper cushion covers the boundary between the backrest and the lower cushion in the bed configuration.

This provides a mattress (in the bed configuration) which does not have a straight boundary or join extending without interruption through its body. There are instead first and second joins which are offset from each other. The term 'join' refers to an interface, not a fastening. Consequently, when load is applied on top of either join, the degree of cushion spreading is minimal, and so it is more comfortable to sleep on. In the case of the backrest and lower cushion boundary, the top cushion can distribute the load to either side to minimise cushion separation. For the upper/lower cushion boundary, the lower thickness of the upper cushion compared to the lower cushion means that the height of the boundary through the mattress is minimal, and so any cushion separation under load is negligible.

A ramp element (or elements) may be provided adjacent to the backrest. The ramp element is preferably below the backrest. The ramp element is also preferably behind the squab. A rear portion of the backrest may be contoured to complement the ramp element for aiding movement between the seat and bed configurations.

The ramp element reduces the frictional barrier to pulling or pushing of the backrest during the transition from seat configuration to bed configuration, or vice versa. When the squab is moved laterally to its second (bed) position, the backrest is pulled from an upright position into a horizontal position. The ramp and curved rear of the backrest co-operate to enable a smooth transition. The same applies in the reverse operation, when movement of the squab pushes the backrest back into an upright position.

The bedding may be releasably connected to the squab. The releasable connection may be provided by at least one of the following: poppers, buttons, one or more zips, magnetic clips, hook and loop fasteners.

This enables the bedding to be easily removed for washing. It also means that the bedding remains substantially fitted in place during storage in the seat configuration, and should not need to be re-made once the seat is opened into the bed configuration.

The bedding of one seat may have complementary connection means for connection to the bedding of another seat. This is useful where two seats are provided for use together as a double bed. It is usually not necessary to connect the bed sheets together, but it is useful to connect the duvet sections together to provide a single duvet across both seats in the bed configuration.

A rollable or slidable support may be provided in the seat. The squab may be connected to and moveable with the support. The conversion mechanism may be configured to move the support. The support may be a frame.

The support provides a structure under the squab to support it in the laterally-displaced position in the bed configuration. Having a rollable or slidable portion in the support makes the conversion process smoother and avoids damaging the floor.

The support may include at least one floor-engaging wheel. The wheel may include a spring mechanism or biasing mechanism configured to substantially disengage the wheel from the floor when a load is applied to the seat.

Using sprung wheels or similar ensures that the support does not move when the bed is occupied. When the occupant(s) have vacated the bed, the wheel re-engages the floor sufficiently to enable movement of the frame again, and so the bed configuration can be readily converted into the seat configuration.

The conversion mechanism may include at least one actuator. A control may be provided for operating the or each actuator.

The actuator can exert a linear force on part of the seat to extend or retract the squab, and convert the seat between configurations. This makes automatic conversion of the seat effectively effortless. Providing a control enables this to be done at the press of a button, for example.

The seat may be lockable in the bed configuration. This prevents inadvertent conversion of the bed configuration into the seat configuration, which could cause injury if the bed is occupied at the time.

The upper and lower cushions of the squab may both be substantially flat. The cushions may each have a cross-section of uniform thickness. This contributes to having a substantially flat mattress in the bed configuration without uncomfortable bumps.

The lower cushion may be longer than the upper cushion. In the bed configuration, the upper cushion may cover the backrest and a rear portion of the lower cushion. The squab may have a roughly L-shaped side profile or cross-section in the seat configuration, and a rectangular side profile or cross-section in the bed configuration (when the upper cushion is on top of the backrest which abuts the lower cushion).

This allows a thinner rear portion of squab to be provided, and the backrest can be correspondingly less tall. This avoids needing to have an uncomfortably high backrest in order to provide a long enough bed. This also helps to offset backrest to lower cushion interface from the lower cushion to upper cushion interface (i.e. the joins between the different parts do not line up).

According to a second aspect of the present invention, there is provided a seat arrangement comprising a seat according to the first aspect of the invention, and a second seat disposed opposite the first seat.

The seats may be separated by a gap when the seats are in their respective seated configurations. One of the squabs may span the gap in its bed configuration. Both of the squabs may together span the gap. The gap provides leg room in the seat configuration.

Preferably, the second seat is also a seat according to the first aspect of the invention.

If one seat with a conversion mechanism is provided, it can span the full gap to the other seat. If two seats with conversion mechanisms are provided, the seats can meet halfway across the gap. It may be that one seat extends more than halfway across the gap, and the other seat extends across the difference. This can provide the boundary between the two lower cushions of the respective squabs in a location which is less likely to bear a load, and so the user is less likely to feel discomfort when sleeping on the bed configuration of the seats.

According to a third aspect of the present invention, there is provided a seat arrangement moveable between a seat configuration and a bed configuration, the seat arrangement comprising a pair of opposing seats separated by a gap in the seat configuration, and moveable towards each other to a central position across the gap for forming a bed with a substantially even surface.

each seat comprising a squab, a backrest, and a conversion mechanism which is configured to laterally displace the respective squab to meet the other squab across the gap in the bed configuration, each conversion mechanism or squab further being configured to move the respective backrest into a horizontal position at an end of the squab in the bed configuration, for occupying a space occupied by the squab in the seat configuration but which is made available by lateral displacement of the respective squab into the bed configuration.

This arrangement is advantageous because minimal effort is required to convert the seats into a bed, and back again. The backrests flatten down into positions at far ends of the squabs, so they do not need to be carried far or turned over. The mechanism also avoids the need to manually carry or shift bulky/heavy squab cushions, which are only properly accessible from end in a caravan, for example. The gap has uniform width between the seats. The gap spans a distance less than lateral width of both seats combined.

Some or all of the features of the seat according to the first aspect of the invention may be provided in this seat arrangement. This applies to either or both of the seats. For example, the backrest may move substantially in concert with the squab, to occupy the space vacated by moving the squab out into the bed position.

According to a fourth aspect of the present invention, there is provided a seat cushion comprising an upper cushion and a lower cushion, one or both of the cushions including or forming a pocket for bedding, the cushions being connected together and arrangeable in a seat configuration where the cushions are stacked and the pocket is enclosed by the cushions, and a bed configuration where the upper cushion is turned over relative to the lower cushion, for allowing access to the bedding.

The upper cushion may be connected to the lower cushion. The upper cushion may be flipped or folded over relative to the lower cushion. The bedding is preferably connected or fitted to one or both of the cushions. This provides a ready-made bed in the bed configuration, at least with a bed sheet pre-fitted to the mattress which is formed by the cushions.

This provides a seat cushion which can store bedding integrally within the seat. The pocket is big enough to contain a bedsheet without distorting the shape of the cushions in the seat configuration. Ideally the pocket should be large enough to also contain a duvet without significantly distorting the cushion. When the seat is converted into the bed configuration, the bedding is preferably ready for use, although it may need smoothing out, for example.

According to a fifth aspect of the present invention, there is provided a kit of parts for providing a seat which is moveable between a seat configuration and a bed configuration, the kit comprising a squab including upper and lower cushions,
a backrest,
the upper cushion of the squab being movable relative to the lower cushion for covering the backrest in the bed configuration,
at least one actuator for moving the squab, and a rollable or slidable support for the squab, and
connections means for connecting the backrest to the squab or rollable or slidable support therefor, and for connecting the actuator to the squab.

The kit enables an existing seat to be converted to a seat according to the first aspect of the invention. This is useful for retro-fitting an existing vehicle (e.g. a caravan) with a seat system according to the present invention.

According to a sixth aspect of the present invention, there is provided a vehicle comprising at least one of: a seat according to the first aspect of the invention; a seat arrangement according to the second aspect of the invention; a seat arrangement according to the third aspect of the invention; a seat cushion according to the fourth aspect of the invention; a kit according to the fifth aspect of the invention.

The vehicle may be selected from the following group: a caravan, a boat or seafaring vessel, a bus, a car, a van, a train, an aeroplane. Alternatively, one or more of the aspects of the invention may be provided in a building, for example: a house, an apartment, or a hotel.

According to a seventh aspect of the present invention, there is provided a seat moveable between a seat configuration and a bed configuration, the seat comprising a squab including upper and lower cushions, a backrest connected to the squab for moving with the squab, and a conversion mechanism configured to move the squab, for converting the seat between the seat and bed configurations, the squab being laterally displaceable by the conversion mechanism between a first position in the seat configuration and a second position in the bed configuration, the backrest being configured to occupy a space at an end of the squab which is made available by lateral displacement of the squab into the second position, and the upper cushion of the squab being movable relative to the lower cushion for covering the backrest in the bed configuration.

The advantages for each of the second to seventh aspects of the invention are substantially similar or substantially correspond to the advantages discussed for the first aspect of the invention.

Any of the second to seventh aspects of the invention may include one or more features presented with respect to the first aspect of the invention.

BRIEF DESCRIPTION OF THE DRAWINGS

For a better understanding of the present invention, and to show more clearly how it may be carried into effect, reference will now be made by way of example only to the accompanying drawings, in which.

DESCRIPTION OF PREFERRED EMBODIMENTS

Figure 1A:
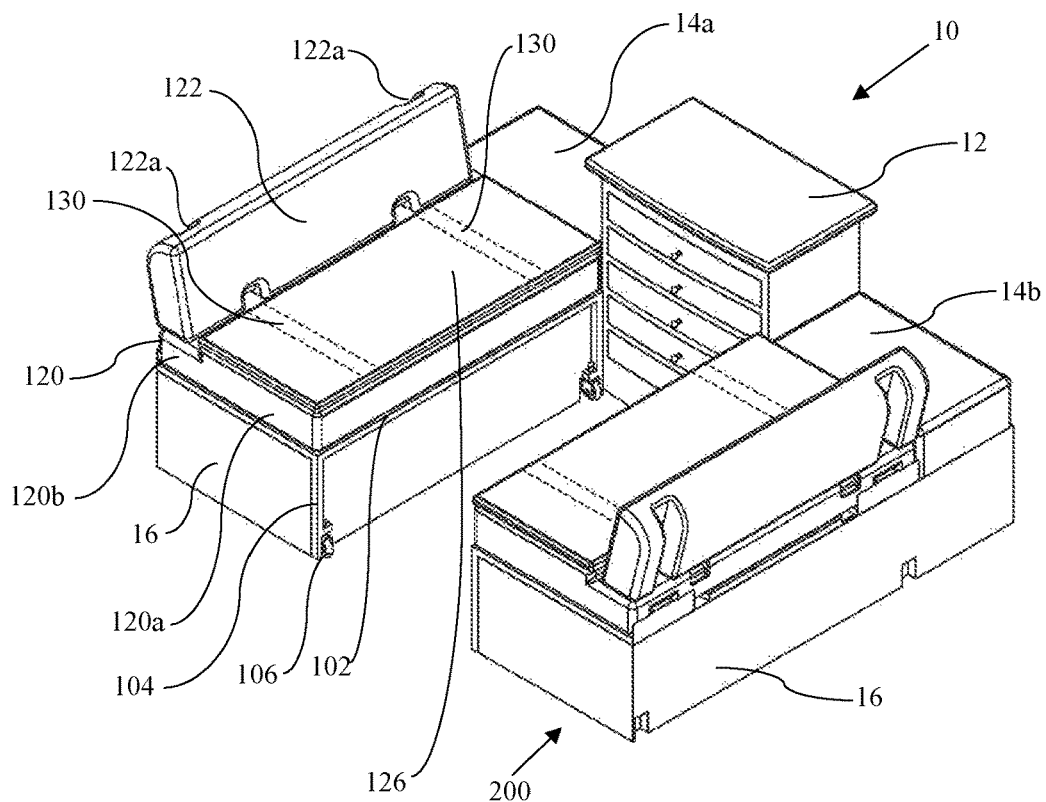
FIG. 1A shows a perspective view of two seats according to the present invention, each seat being in a seat configuration.
Figure 1B:
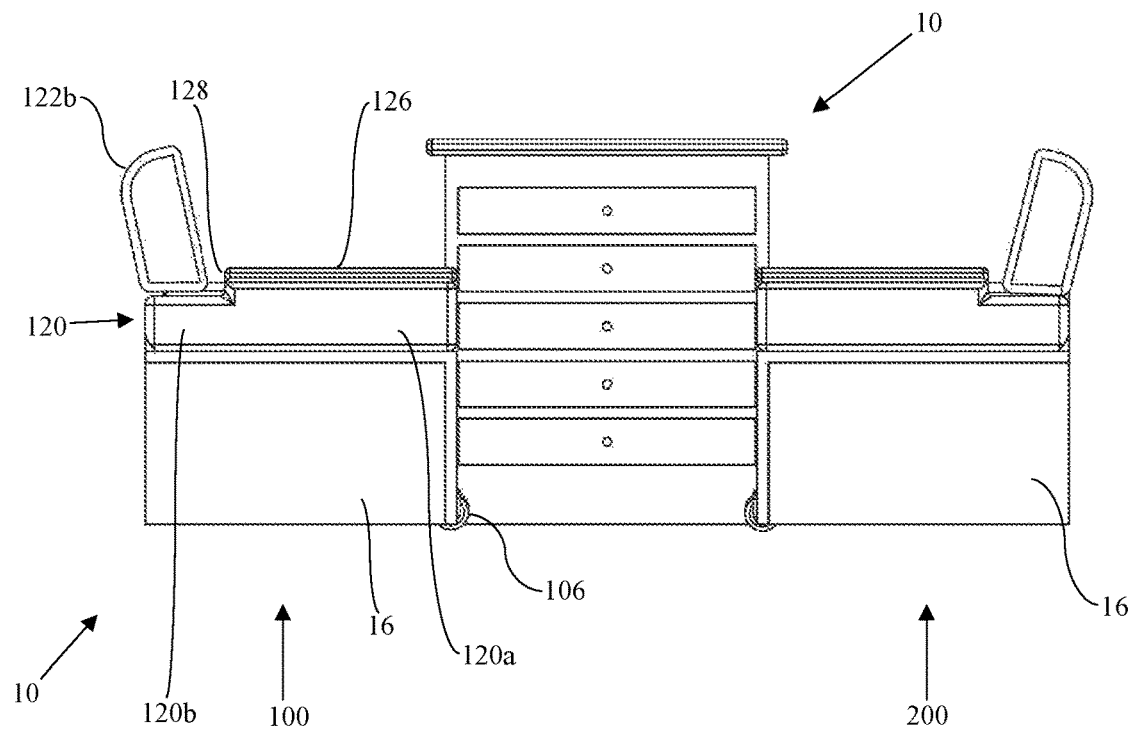
FIG. 1B shows a side view of the seats of FIG. 1A.
Figure 1C:
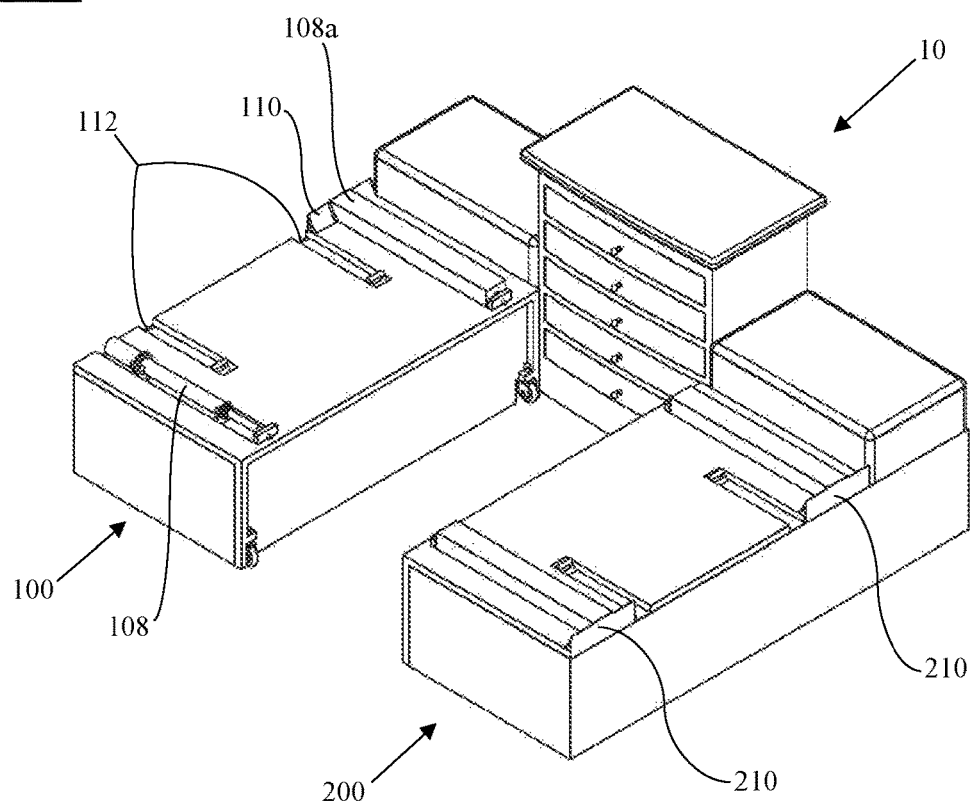
FIG. 1C shows a cutaway perspective view of the seats of FIG. 1A, showing part of a conversion mechanism of each seat.
Figure 3A:
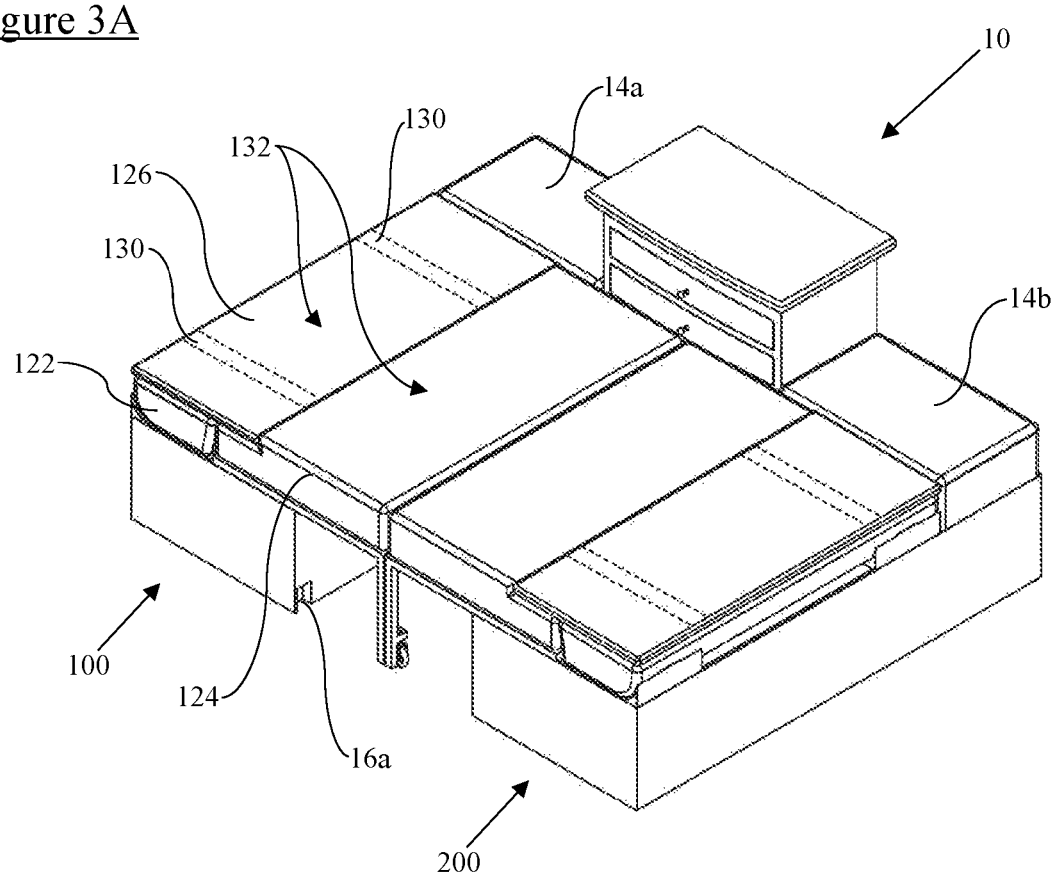
FIG. 3A shows a perspective view of a bed formed from the seats of FIG. 1A, each seat being in a bed configuration.

Referring firstly to FIGS. 1A to 1C, an embodiment of a seat arrangement is indicated generally at 10. The seat arrangement 10 includes a first seat indicated generally at 100, and a second seat indicated generally at 200. The seats are separated by a gap 11. Each seat 100, 200 is shown in a seat configuration. Each seat 100, 200 is shown in a corresponding bed configuration in FIGS. 3A to 3C. The seats 100; 200 are moveable or interconvertible between these configurations.

The seat arrangement 10 is depicted adjacent to a chest of drawers 12 and tables 14a, 14b. These elements are typically found in a vehicle such as a caravan, which is where the seat arrangement of this embodiment is located. The tables 14a, 14b may be replaced by cushions.

Each seat 100, 200 is substantially identical in this embodiment. The following description will refer primarily to just one of the seats 100, 200 for brevity. Unless noted otherwise, elements described with respect to the first seat 100 (numbered parts of the form 1xx, where x is a number) should be assumed to have an equivalent part (numbered 2xx) present on the second seat, even if such parts are not explicitly labelled.

The seat 100 is mounted on a unit 16. The unit 16 is a wooden or MDF box that forms part of a caravan. A frame 102 is fitted on the unit 16. The frame 102 is made of aluminium for its low weight and good strength, but any suitable material can be used.

With particular reference to FIG. 1C, the frame 102 includes a support surface 103. The frame 102 also has first and second legs 104 disposed at either end of the unit 16. Each leg 104 includes a wheel 106. Each wheel 106 includes a spring arrangement (not shown). The unit 16 includes recesses 16a for receiving the wheels 106 when the seat 100 is in a seat configuration. In the bed configuration, the legs support the centre of the bed.

When there is effectively no load on the wheels 106, the wheels are floor-engaging and enable the frame 102 to roll forwards and backwards relative to the unit 16. When weight is applied to the frame, particularly when it is laterally displaced from the unit 16 as shown in FIG. 3C, the spring arrangements allow the wheel axles to move relative to the legs, which can touch the floor. This prevent the wheels from being placed under excessive load and allows the legs 104 to be the primary weight-bearing portion.

The seat 100 further includes two actuators 108. In one embodiment, the actuators 108 are screw automated. Each actuator 108 is an extendible arm. Each actuator 108 is encased by a housing 108a. Each actuator 108 is electrically powered. A control (not shown) is provided to operate the actuators 108 on demand. In this embodiment, the control is linked to the actuators of both seats 100, 200. The control is a button in this embodiment.

Each actuator 108 runs from a 12V power source within the caravan in this embodiment. The frame 102 has cut out portions to accommodate each actuator 108 and housing 108a. An end of each actuator 108 is connected to the frame 102, for pushing the frame into a bed configuration, or pulling the frame 102 into a seat configuration (depending on the starting configuration).

A ramp 110 is provided rearward of each actuator 108. Each ramp 110 is connected to the respective actuator housing 108a in this embodiment. Each ramp 110 has a curved surface. The curved surface is concave. The ramp 110 is approximately a quarter-circle. In some embodiments, the ramp 110 can tangentially blend into a surface of the unit 16.

Referring again to FIGS. 1A and 1B, cushions are shown on top of the frame 102. One of the cushions is a seat squab 120, which is connected to a flat area 103 of the frame 102. The squab includes a forward portion 120a and a rearward portion 120b of different thicknesses. The rearward portion 120b has a reduced thickness relative to the forward portion 120a. In this case, the difference in thickness is of the order of centimetres.

Another of the cushions is a backrest 122, which is provided on one side of the seat squab 120, to form a seat or sofa together with the squab 120. The backrest 122 lies atop the rearward portion 120b of the squab 120 in this embodiment. The backrest 122 is connected to the squab 120. Connecting elements (e.g. bars or arms, not shown) provide a flexible connection between the backrest 122 and squab 120. The connecting elements are rigid enough for transferring pulling or pushing forces from the squab to the backrest when the seat is transitioning between a seat configuration and a bed configuration. The backrest 122 may in some embodiments be stitched to the squab 120. Note that the ramp 110 is static in this embodiment. In other words, the ramp 110 does not change positions between seat and bed configurations of the seat.

Recesses or channels 122a are provided in a rear face of the backrest 122. The channels 122a are shaped to complement the actuator housings 108a. An upper rear end 122b of the backrest 122b is curved. This curvature is selected to complement the curvature of the ramp 110, to aid movement of the backrest 122 between the seat and bed configurations. The ramp 110 provides a bearing surface for moving the backrest 122 between horizontal and upright orientations.

The squab 120 can also be considered to include a base portion 124 and a top portion 126. The base and top portions 124, 126 are lower and upper cushions. Both portions 124, 126 are flat on top. The base portion 124 is also flat-fronted for abutting the corresponding base portion of the second seat 200. The base portion 124 includes the forward and rearward portions 120a, 120b. The top portion 126 is pivotally connected to the base portion 124. The pivot 128 (shown in FIG. 2B) runs along a rear edge of the top portion 126, at an end nearest the backrest 122. The top portion 126 is stitched to the base portion 124 along the pivot 128 in this embodiment. The top portion 126 overlies the thicker forward portion 120a of the squab 120 in the seat configuration. The top portion is a few centimetres thick in this embodiment. The underside of the top portion 126 of the squab 120 is not upward-facing in the seat configuration. However, it forms part of a bed area in the bed configuration.

Figure 2A:
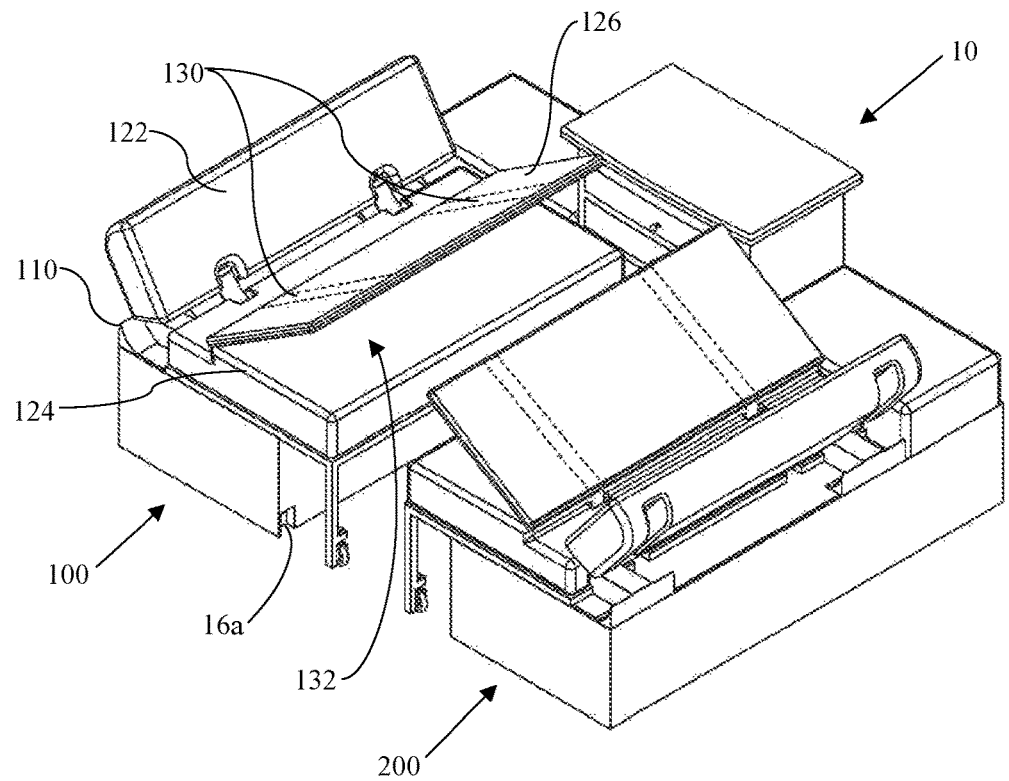
FIG. 2A shows a perspective view of the seats of FIG. 1A, each seat being in transition between a seat configuration and a bed configuration.

The top portion 126 is connected or tethered to part of the unit 16 in this embodiment. Tethers 130 are provided within the body of the squab 120. The tethers 130 have a fixed length and are relatively inextensible. At one end, the tethers 130 are connected over the pivot 128 to an upward-facing surface (in the seat configuration) of the top portion. At the other end, the tethers 130 are secured to a corresponding portion of the unit, disposed below the first end. Tether points 130a are shown in FIG. 2C, for example. The tethers 130 extend through the squab 120. In this embodiment, the tethers 130 are disposed at a boundary between the forward and rearward portions 120a, 120b. The frame 102 has cut out sections 112 to accommodate the tethers 130.

Where a kit of parts is provided, for a caravan, for example, the frame 102 including wheels 104 is fitted to the unit 16 and the actuators 108 installed. The unit 16 and/or parts of the vehicle may need to be modified (e.g. portions cut out) to do this. The ramps 110 are installed, and then the cushions fitted on top. The squab 120 may be connected to the frame 102 using a hook and look fastener, for example. Alternatively, the frame 102 may have a lip that engages the squab 120, or may have sufficient surface friction to engage and move the squab 120 between configurations.

Referring also to FIGS. 2A to 4C, the top and base portions 126, 124 are shown in further detail. A bed area 132 can be seen inside the squab 120 in FIG. 2A, which was substantially hidden from view by the top and base portions 126, 124 in the seat configuration. Bedding (not shown) such as a bedsheet and a duvet is contained within that area 132. The duvet of the first seat 100 includes connection means (e.g. fasteners) for connection to corresponding connection means on the duvet in the second seat 200.

Figure 3B:
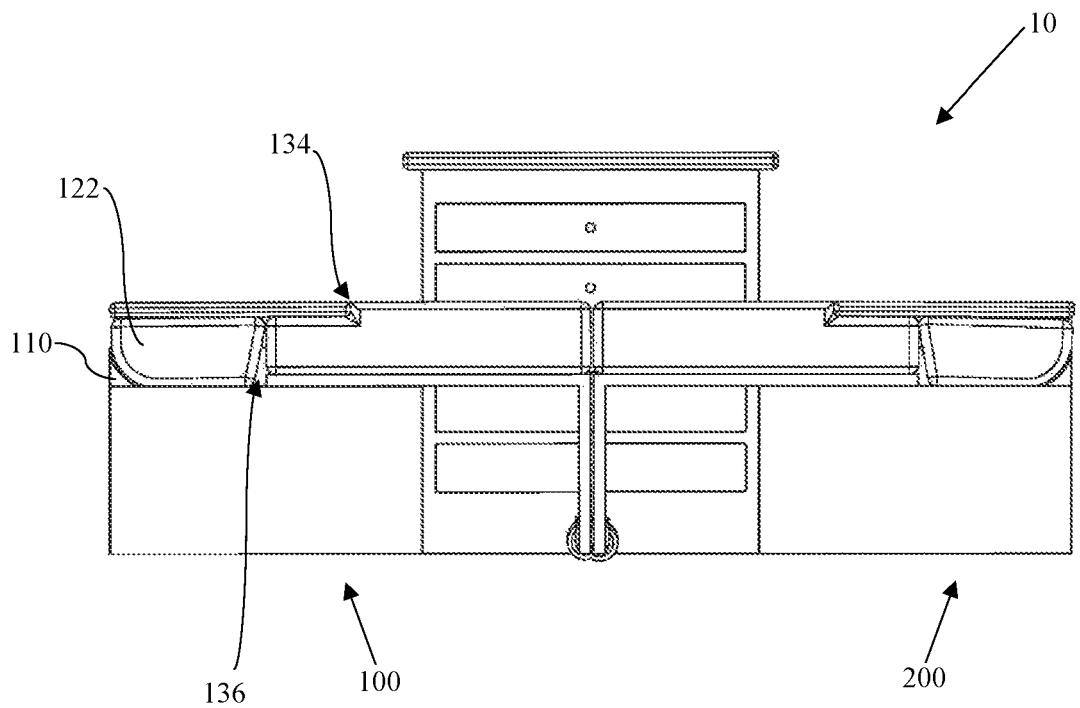
FIG. 3B shows a side view of the bed of FIG. 3A.
Figure 3C:
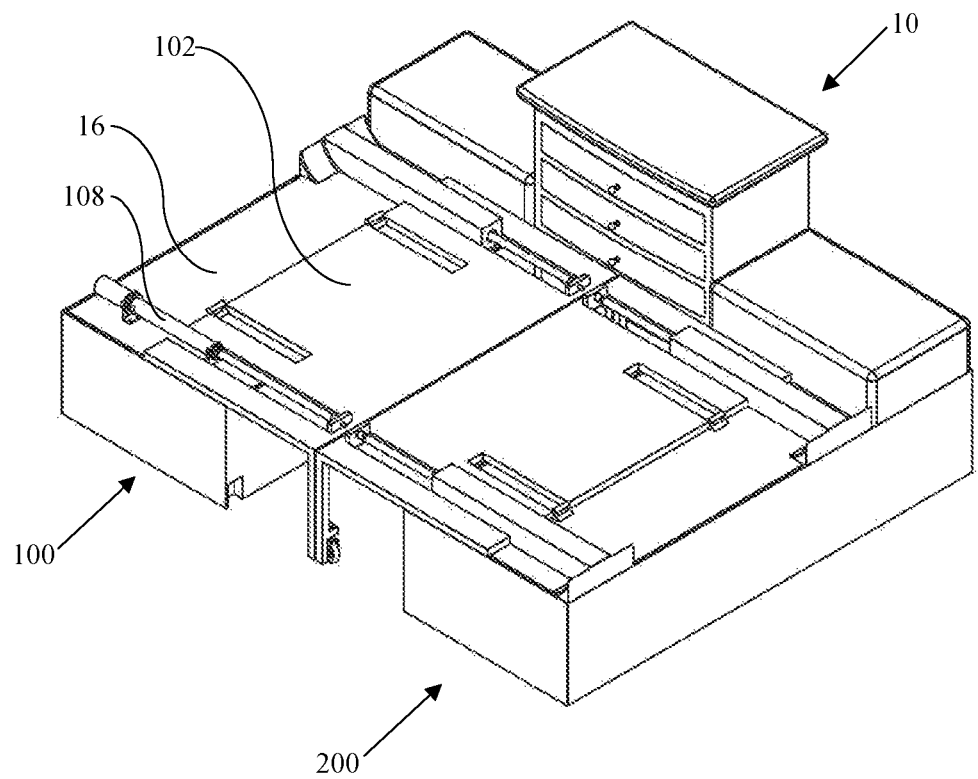
FIG. 3C shows a cutaway perspective view of the bed of FIG. 3A, showing only the conversion mechanisms of FIG. 1C in the bed configuration.

With particular reference to FIG. 3B, the seats 100, 200 are shown in the bed configuration. The backrest 122 lies adjacent to an end of the base portion 124 of the squab 120. The top portion 126 of the squab has been flipped over to lie on top of the backrest 122. The combined thicknesses of the backrest 122 and top portion 126 match the thickness of the base portion 124. This forms a mattress of substantially uniform thickness having a flat/level surface. Part of the support frame 102 is still supported by the unit 16 in the bed configuration.

A boundary 134 between the top and base portions 126, 124 (i.e. at pivot 128) is laterally offset from a boundary 136 between the backrest 122 and base portion 124. This 'zigzag' or staggering of the boundaries 134, 136 ensures that compression on a particular part of the mattress does not cause substantial separation of two parts of the mattress formed by the cushions.

Figure 2B:
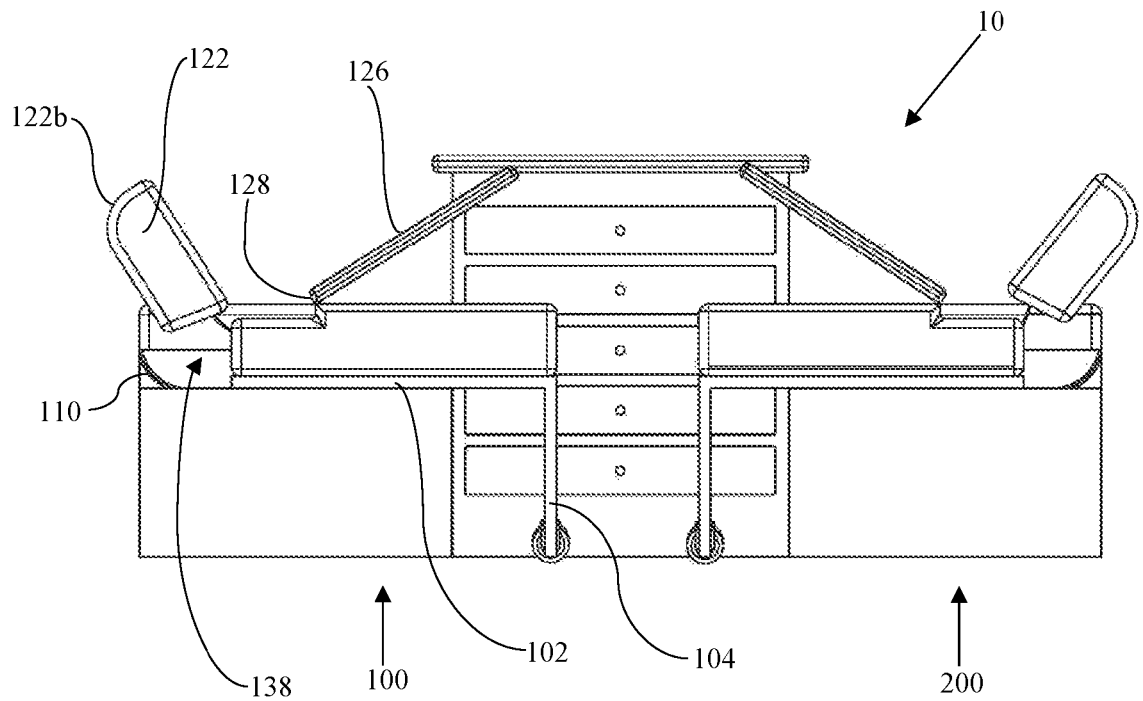
FIG. 2B shows a side view of the seats of FIG. 2A.
Figure 2C:
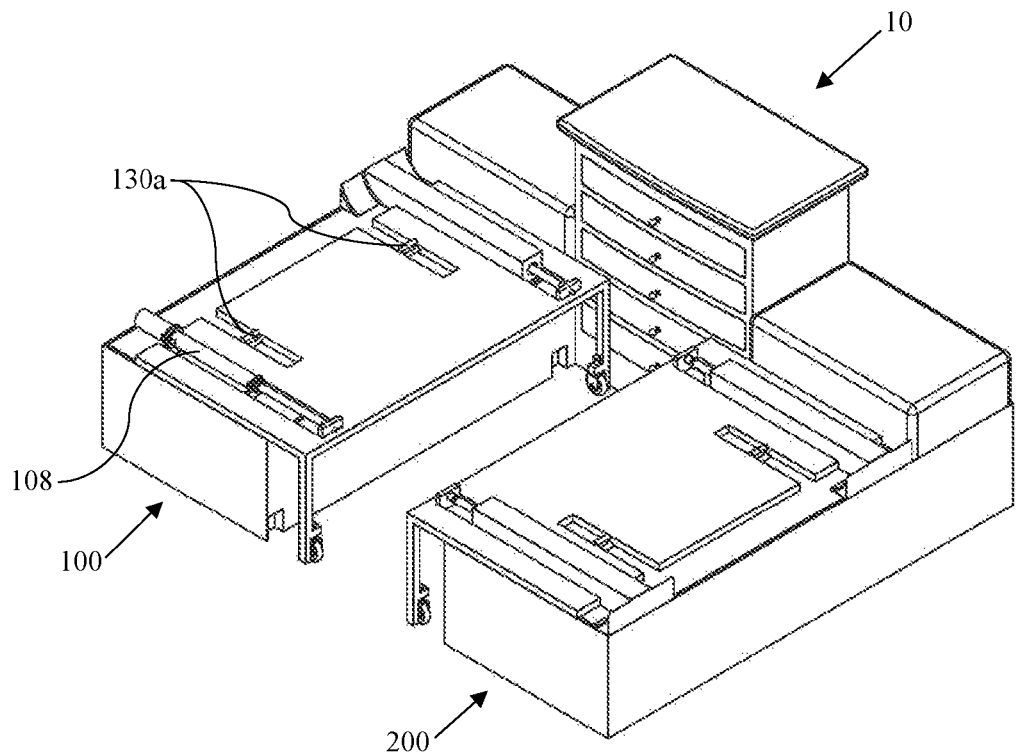
FIG. 2C shows a cutaway perspective view of the seats of FIG. 2A, showing the conversion mechanisms of FIG. 1C during the transition between seat configurations.

It can also be seen in FIG. 2B, for example, that lateral displacement of the squab 120 has created a space 138 where the rearward portion 120b used to be. The backrest 122 is pulled into that space 138 by movement of the squab 120. This is done as part a concerted movement of the squab 120 and backrest 122, in which case the backrest would enter/vacate the space 138 as the squab 120 vacates/entered that same space 138. For this purpose, the space 138 does not necessarily need to be an unoccupied space, but can be a region which is occupied by one or other of the squab 120 and backrest 122 according to the seat configuration.

Figure 4A:
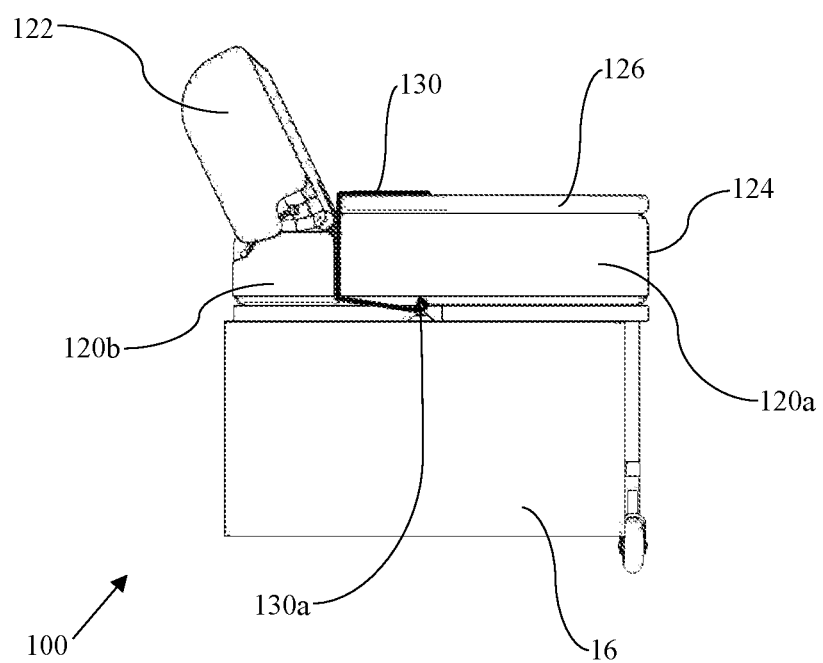
FIG. 4A shows a side view of one of the seats of FIG. 1A in a seat configuration, and a tether for flipping over a upper cushion of the seat.
Figure 4B:
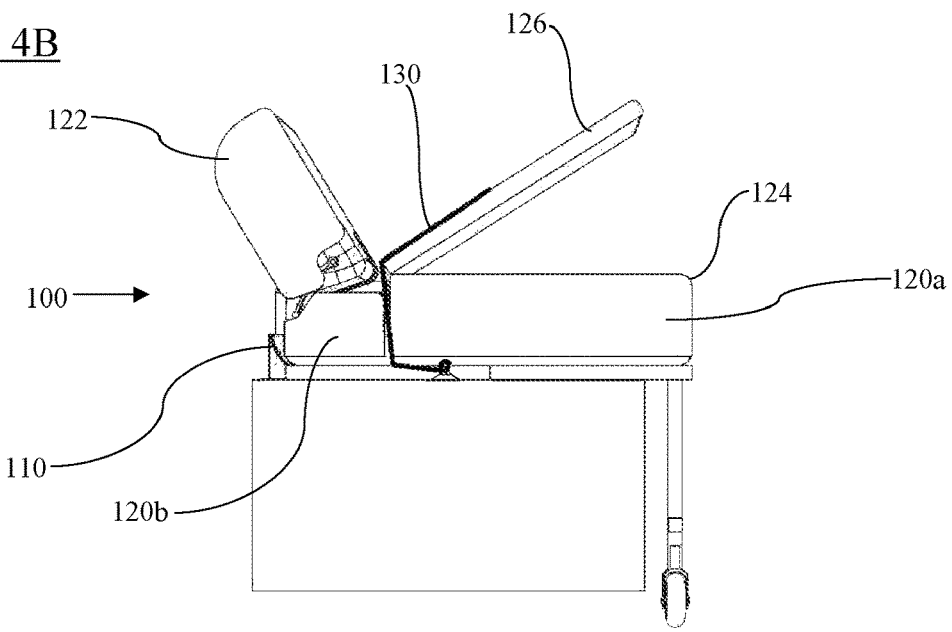
FIG. 4B shows another side view of the seat and tether of FIG. 4A, transitioning between a seat configuration and a bed configuration.
Figure 4C:
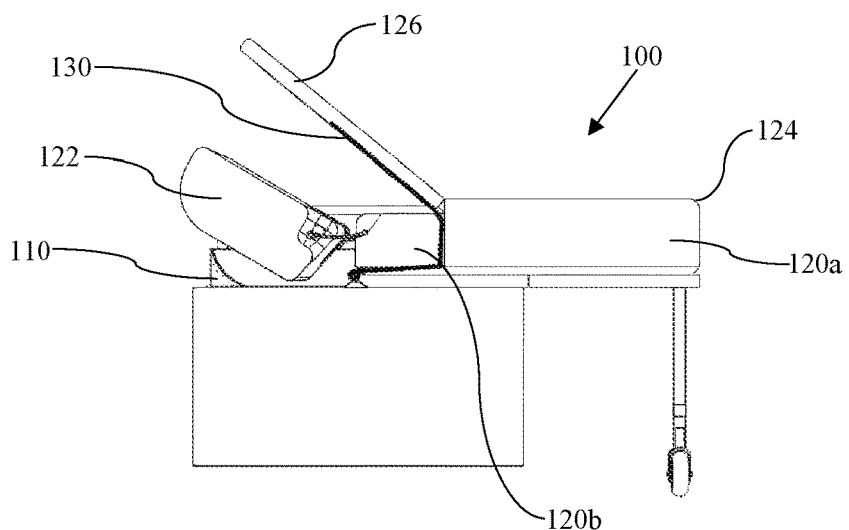
FIG. 4C shows a further side view of the seat and tether of FIG. 4A, further into a transition between a seat configuration and a bed configuration.
Figure 4D:
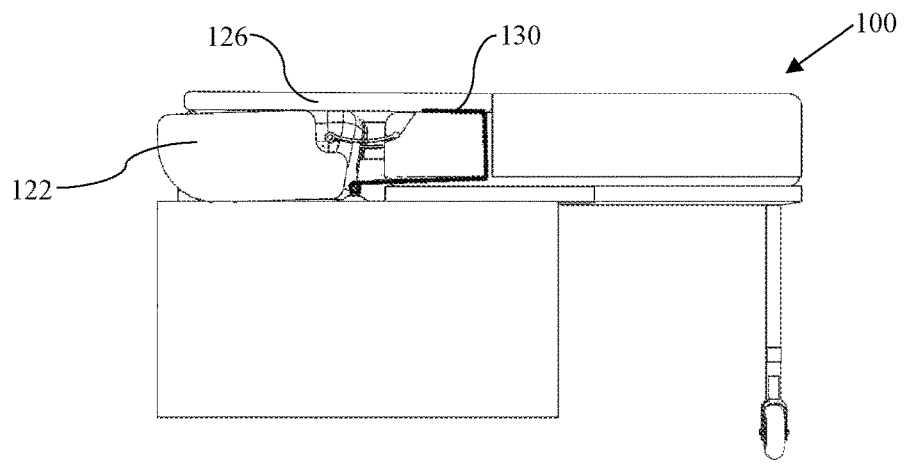
FIG. 4D shows a further side view of the seat and tether of FIG. 4A in a bed configuration.

FIGS. 4A to 4D illustrate one of the tethers 130 which regulates movement of the top portion 126. In FIG. 4A, the tether 130 is arranged around the top portion 126 and the forward portion 120a of the squab. In FIG. 4B, during movement of the squab 120, the rearward portion 120b bears against the tether 130. Due to the fixed length of the tether 130, this exerts a force on the top portion 126, rotating it about the pivot. Continued movement of the squab 120 as seen in FIG. 4C causes the rearward portion 120b to move over the anchor point of the tether 130. This inverts the tether orientation. FIG. 4D shows the tether in the bed configuration, arranged around the rearward portion 120b of the squab 120.

In use, the seat 100 can be in the seat configuration as in FIGS. 1A-1C. The control button is pressed to initiate the conversion from seat configuration to bed configuration. This causes the actuators 108 to extend, pushing the frame linearly outwards to displace it away from the unit 16, towards the other seat 200. The squab 120 moves with the frame; and the connection to the backrest 122 pulls the backrest forwards at the same time.

As this is occurring, the tethers 130 are redistributed and exert a force on the top portion 126 of the squab 120. This rotates the top portion 126 about the pivot 128, as seen in FIGS. 2A-2B and explained with respect to FIGS. 4A-4D above. The top portion 126 ends up in an inverted position on top of the backrest 122.

Linear movement of the actuator 108 and squab 120 leads to translation and rotation of the backrest 122 into the plane of the squab 120. It also leads to rotational movement of the top portion 126, which levels off the backrest to form a planar surface for sleeping on. The movements of the actuator 108, base portion 124, backrest 122 and top portion 126 are all substantially concerted in this embodiment. However, it will be appreciated that the different events may occur at different rates, and begin and/or end at different times within the process.

As two seats 100, 200 are provided, both seats 100, 200 undergo this process. The seats 100, 200 meet in the middle of the gap 11. The resulting flat sleeping surface (which combines the bed areas of each seat) is at substantially the same height as the tables 14a, 14b in this embodiment.

The reverse operation, to convert the seat 100 to a seat configuration from a bed configuration, can also be performed. Again, the control button is pressed to initiate the conversion from seat configuration to bed configuration. The events described above occur in an opposite sense.

It will be appreciated that only one seat which is convertible between seat/bed configurations may be provided. The conversion process is substantially similar. It will also be appreciated that the process may be performed in a stepwise manner (performing the steps sequentially rather than concertedly).

Other embodiments may include additional or alternative features to those described above. For example, the vehicle may be a boat, a bus, a car, a van, a train, an aeroplane, instead of a caravan. The seat may be provided in a building, for example in a house, a hotel, or an apartment. If provided in a home, the seat or seat arrangement could be provided in a bedroom or in a living room or lounge, for example. The frames of opposing seats may have an interlock or other connections means to lock them together. There may be complementary connections on the frames so that they need to be at the same level in order to connect to each other, contributing further towards providing a flat sleeping surface by providing a combined, level frame.

In some embodiments, the backrest may not be directly connected to the squab. The conversion mechanism may instead be configured to move the backrest as well as the squab. For example, a portion of the backrest may be connected to the frame.

In some embodiments, the bedding can be stored in a pocket formed between the portions of the squab. The bedding can be integrated with the squab. Releasable connectors can keep the bedding, e.g. a bedsheet, fitted to the squab.

Regarding the frame, instead of providing wheels, then casters or low-friction elements could be provided. Corresponding runners or low-friction strips could be provided on the floor. If the frame is sufficiently rigid and/or securely mounted to the unit in the vehicle, then legs may not be necessary to provide central support for the squab in the bed configuration. The frame could be suspended, or where two seats are provided the frames could interlock and support each other.

The embodiments described above are provided by way of example only, and various changes and modifications will be apparent to persons skilled in the art without departing from the scope of the present invention as defined by the appended claims.

The invention claimed is:

1. A seat cushion for a seat which is moveable between a seat configuration and a bed configuration, the seat cushion comprising
   a squab including upper and lower cushions which are connected together, and
   a backrest connected to the squab by connecting elements providing a flexible connection between the squab and backrest for pulling the backrest into the bed configuration when the squab is laterally displaced,
   the seat cushion being arrangeable in a seat configuration where the upper and lower cushions are stacked and the backrest is in an upright position, and a bed configuration where the backrest is in a horizontal position next to the lower cushion, and the upper cushion is turned over relative to the lower cushion and disposed on top of the backrest,
   in which an upper rear end of the backrest is curved for aiding movement of the backrest along a ramp between the seat and bed configurations.

2. The seat cushion as claimed in claim 1, in which the upper cushion is hingedly connected to the lower cushion by stitching.

3. The seat cushion as claimed in claim 1, when installed in a vehicle selected from the group consisting of: a caravan, a boat, a bus, a car, a van, a train, an aeroplane.

4. The seat cushion as claimed in claim 1, in which recesses or channels are provided in the rear face of the backrest for accommodating actuator housings for moving the seat cushion.

5. The seat cushion as claimed in claim 1, in which one or more tethers are connected to the upper cushion of the squab for connection to a point or area on the other side of the squab, to in use pivot the upper cushion onto the backrest when the squab is laterally displaced from the seat configuration to the bed configuration.

6. The seat cushion as claimed in claim 1, in which the upper and lower cushions include or form a pocket for bedding, the pocket being enclosed by the cushions in the seat configuration.

7. A seat cushion for a seat which is moveable between a seat configuration and a bed configuration, the seat cushion comprising
   a squab including upper and lower cushions which are connected together, and
   a backrest connected to the squab by connecting elements providing a flexible connection between the squab and backrest for pulling the backrest into the bed configuration when the squab is laterally displaced,
   the seat cushion being arrangeable in a seat configuration where the upper and lower cushions are stacked and the backrest is in an upright position, and a bed configuration where the backrest is in a horizontal position next to the lower cushion, and the upper cushion is turned over relative to the lower cushion and disposed on top of the backrest,
   in which one or more tethers are connected to the upper cushion of the squab for connection to a point or area on the other side of the squab, to in use pivot the upper cushion onto the backrest when the squab is laterally displaced from the seat configuration to the bed configuration.

8. The seat cushion as claimed in claim 7, in which the one or more tethers are of fixed length and relatively inextensible.

9. The seat cushion as claimed in claim 7, in which the upper cushion is hingedly connected to the lower cushion by stitching.

10. The seat cushion as claimed in claim 7, when installed in a vehicle selected from the group consisting of: a caravan, a boat, a bus, a car, a van, a train, an aeroplane.

11. The seat cushion as claimed in claim 7, in which recesses or channels are provided in the rear face of the backrest for accommodating actuator housings for moving the seat cushion.

12. The seat cushion as claimed in claim 7, in which the upper and lower cushions include or form a pocket for bedding, the pocket being enclosed by the cushions in the seat configuration.

13. The seat cushion as claimed in claim 7, in which an upper rear end of the backrest is curved for aiding movement of the backrest along a ramp between the seat and bed configurations.

14. A seat cushion for a seat which is moveable between a seat configuration and a bed configuration, the seat cushion comprising
   a squab including upper and lower cushions which are connected together, and
   a backrest connected to the squab by connecting elements providing a flexible connection between the squab and backrest for pulling the backrest into the bed configuration when the squab is laterally displaced,
   the seat cushion being arrangeable in a seat configuration where the upper and lower cushions are stacked and the backrest is in an upright position, and a bed configuration where the backrest is in a horizontal position next to the lower cushion, and the upper cushion is turned over relative to the lower cushion and disposed on top of the backrest,
   in which the upper and lower cushions include or form a pocket for bedding, the pocket being enclosed by the cushions in the seat configuration.

15. The seat cushion as claimed in claim 14, in which the upper cushion is hingedly connected to the lower cushion by stitching.

16. The seat cushion as claimed in claim 14, when installed in a vehicle selected from the group consisting of: a caravan, a boat, a bus, a car, a van, a train, an aeroplane.

17. The seat cushion as claimed in claim 14, in which recesses or channels are provided in the rear face of the backrest for accommodating actuator housings for moving the seat cushion.

18. The seat cushion as claimed in claim 14, in which one or more tethers are connected to the upper cushion of the squab for connection to a point or area on the other side of the squab, to in use pivot the upper cushion onto the backrest when the squab is laterally displaced from the seat configuration to the bed configuration.

19. The seat cushion as claimed in claim 14, in which an upper rear end of the backrest is curved for aiding movement of the backrest along a ramp between the seat and bed configurations.

* * * * *